US006466464B1

(12) United States Patent
Drobnik

(10) Patent No.: US 6,466,464 B1
(45) Date of Patent: *Oct. 15, 2002

(54) METHOD AND APPARATUS FOR HIGH FREQUENCY ALTERNATING CURRENT POWER DISTRIBUTION

(75) Inventor: Josef C. Drobnik, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/312,256

(22) Filed: May 14, 1999

(51) Int. Cl.$^7$ .......................... H02M 5/40; H02M 7/127
(52) U.S. Cl. ........................................ 363/34; 363/127
(58) Field of Search .............................. 363/34, 97, 60, 363/16, 17, 131, 132, 21; 361/90, 91, 86, 664; 395/750; 340/310 R

(56) References Cited

U.S. PATENT DOCUMENTS

| 4,092,711 A | | 5/1978 | Gerding et al. ................ 363/53 |
| 4,362,971 A | * | 12/1982 | Sloan, Jr. ..................... 315/176 |
| 4,729,088 A | * | 3/1988 | Wong .......................... 363/124 |
| 4,837,556 A | * | 6/1989 | Matsushita et al. ..... 340/310 R |
| 4,951,171 A | * | 8/1990 | Tran et al. ..................... 361/90 |
| 5,157,319 A | * | 10/1992 | Klontz et al. .................. 320/21 |
| 5,225,972 A | | 7/1993 | Sakamoto |
| 5,301,096 A | * | 4/1994 | Klontz et al. .................. 363/37 |
| 5,500,791 A | * | 3/1996 | Kheraluwala et al. ........ 363/17 |
| 5,598,326 A | | 1/1997 | Liu et al. |
| 5,714,845 A | * | 2/1998 | Heering et al. ............. 315/174 |
| 5,856,712 A | * | 1/1999 | Suzuki et al. .................. 363/34 |
| 6,115,276 A | * | 5/2000 | Mao ............................ 363/127 |

FOREIGN PATENT DOCUMENTS

EP          0360156 A2    9/1989

OTHER PUBLICATIONS

Search Report—PCT—PCT/US 00/11961.
Praveen Jain, Hybrid High Frequency AC Power Distribution Architecture for Telecommunication Systems, IEEE Transactions on Aerospace and Electronic Systems, vol. 35, No. 1, Jan. 1999.

* cited by examiner

*Primary Examiner*—Rajnikant B. Patel
(74) *Attorney, Agent, or Firm*—Blakely, Sokoloff, Taylor & Zafman LLP

(57) ABSTRACT

A method for distributing power in a electronic system includes transmitting power in a high frequency alternating current (AC) domain from a system power supply of the computer system to a high frequency AC voltage regulator module.

27 Claims, 7 Drawing Sheets

METHOD AND APPARATUS FOR HIGH FREQUENCY ALTERNATING CURRENT POWER DISTRIBUTION

FIELD OF THE INVENTION

The present invention relates to the field of power distribution in computer systems. More specifically, the present invention relates to a high frequency alternating current (AC) power distribution system.

BACKGROUND OF THE INVENTION

One known approach used for distributing power from a power source to components on a computer system is the direct current (DC) power distribution system. The DC power distribution system typically includes a main power supply, voltage regulator modules, and connectors that couple the main power supply to the voltage regulator modules. The main power supply converts low frequency (approximately 50–60 Hz) AC power received from the power source into DC power. The main power supply then converts the DC power into high frequency AC power. The high frequency AC power is then stepped down, converted back to DC power, and filtered before being transmitted along a connector to a voltage regulator module corresponding to a component on the computer system. At the voltage regulator module, the DC power is converted to AC power, stepped down, converted to DC power and filtered before being delivered to a component on the computer system.

A drawback of the DC distribution system was that it imposed dual conversion on the power conversion chain. Dual power conversion added complexity as well as cost and parts-count to the distribution system. Furthermore, the dual power conversion reduced the efficiency of the distribution system. In addition, today's computer systems are being designed with more stringent power specifications. These specifications require increased slew rates (change of current over time). Current DC distribution systems have experienced difficulties in reliably supporting these requirements.

SUMMARY

A method for distributing power in a electronic system is disclosed. Power is transmitted in a high frequency alternating current (AC) domain from a system power supply of the computer system to a high frequency AC voltage regulator module.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
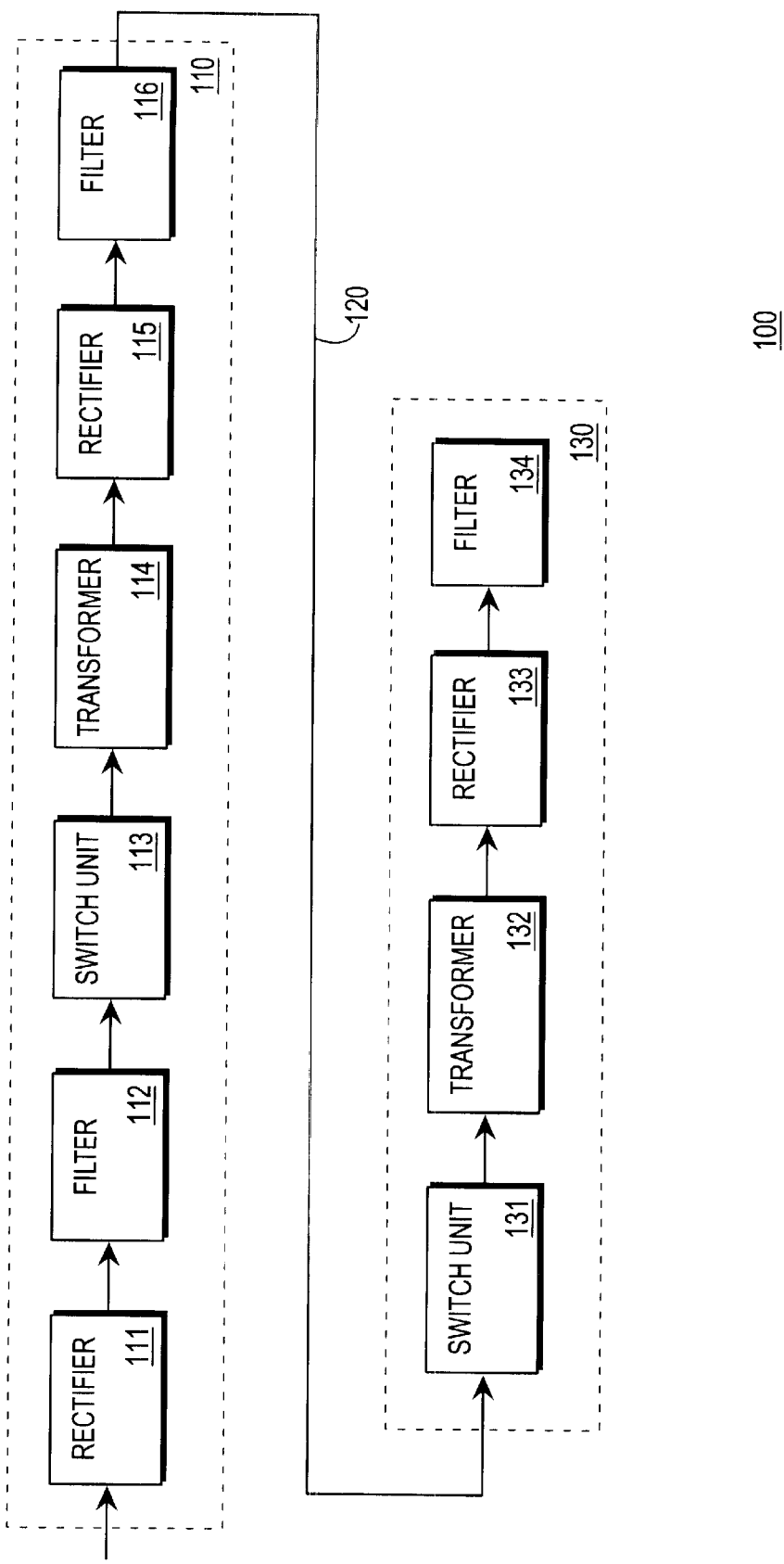
FIG. 1 is a block diagram of a conventional direct current power distribution system.

FIG. 1 illustrates a conventional direct current (DC) power distribution system 100 known in the prior art. The DC power distribution system 100 includes a main power supply 110 and a voltage regulator module 130. The main power supply 110 receives power from a power source (not shown) and processes the power before transmitting it to a voltage regulator module 130. The main power supply 110 includes a first rectifier unit 111 that receives power in a low frequency alternating current (AC) domain from the power source. The first rectifier unit 111 converts the AC power to DC power. A first filter unit 112 is coupled to the first rectifier unit 111. The first filter unit 112 reduces ripple in the DC power. A first switch unit 113 is coupled to the first filter unit 111. The first switch unit 113 receives the DC power from the first filter unit 112 and converts the DC power to high frequency AC power. A first transformer 114 is coupled to the first switch unit 113. The first transformer 114 receives the high frequency AC power from the first switch unit 113 and steps the high frequency AC power down to a lower voltage level. A second rectifier unit 115 is coupled to the first transformer 114. The second rectifier unit 115 receives the high frequency AC power from the first transformer and converts the high frequency AC power to DC power. A second filter unit 116 is coupled to the second rectifier unit 115. The second filter unit 116 receives the DC power from the second rectifier unit 115 and filters away noise from the DC power and transmits the DC power to the voltage regulator module 130.

The voltage regulator module 130 receives the DC power from the main power supply 110 and further regulates the power before transmitting the power to a component on a computer system (not shown). The voltage regulator module 130 includes a second switch unit 131. The second switch unit 131 receives the DC power from the main power supply 110 and converts the DC power to AC power. A second transformer 132 is coupled to the second switch 131. The second transformer receives the AC power from the second switch and steps the AC power down to a lower level. A third rectifier unit 133 is coupled to the second transformer. The third rectifier receives the AC power and converts it to DC power. A third filter unit 134 is coupled to the third rectifier unit 133. The third filter unit 134 receives the DC power from the third rectifier unit 133 and filters away ripple from the DC power. The DC power is transmitted from the power regulator module 130 to a component requiring power.

When multiple voltage regulator modules are coupled to the main power supply 110, the transformer 114 is required to have multiple windings. Additional rectifiers and filters in the main power supply 110 would connect the power from the additional windings of the transformer to additional connectors that transmits the power to the additional voltage regulator modules.

Figure 2:
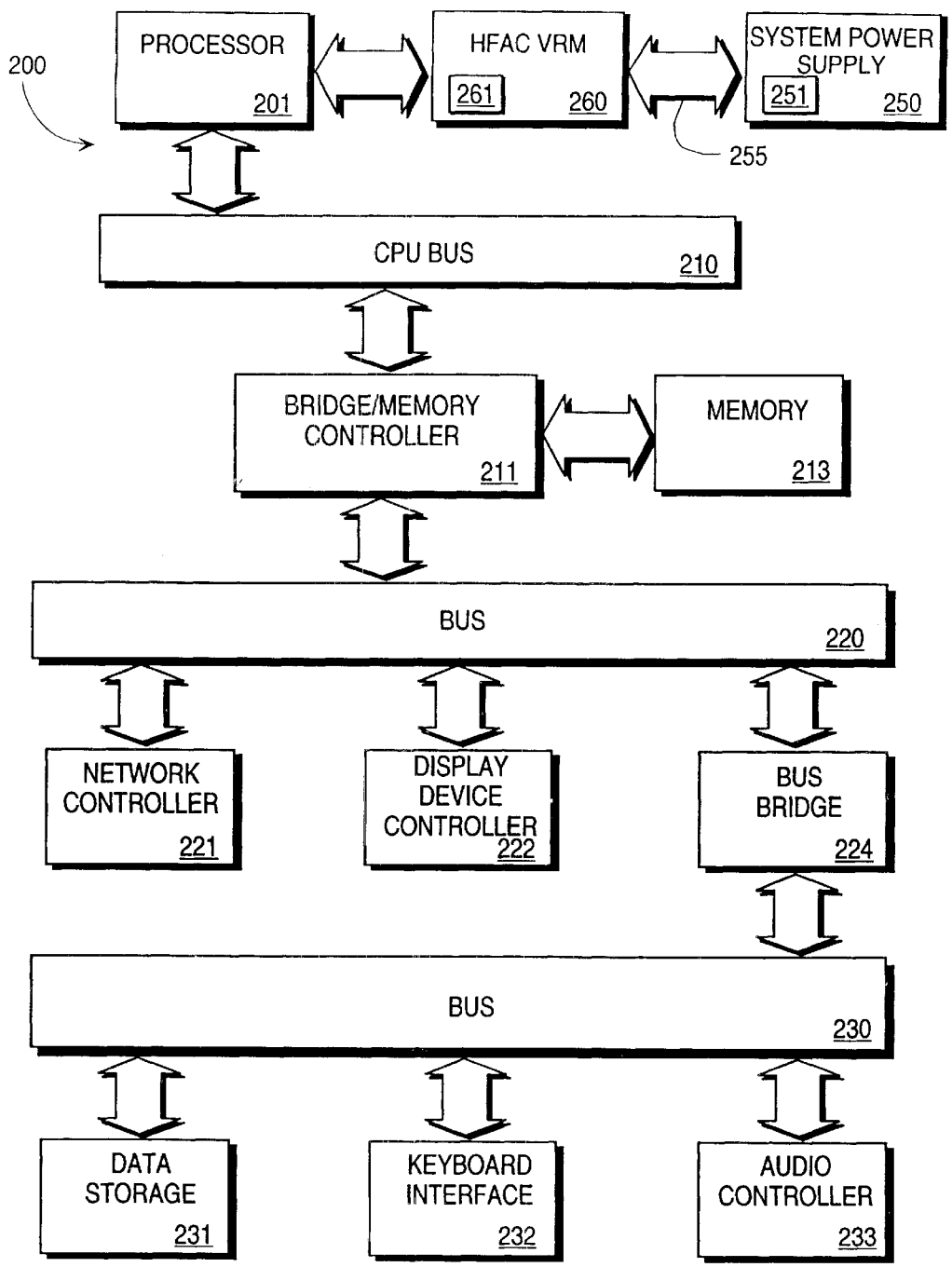
FIG. 2 is a block diagram of a computer system implementing an embodiment of the present invention.

FIG. 2 illustrates a computer system 200 upon which an embodiment of the present invention can be implemented. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a synchronous direct random access memory (SDRAM) device, or other memory device. The memory 213 may store instructions and code represented by data signals that may be executed by the processor 201.

A bridge/memory controller 211 is coupled to the CPU bus 210 and the memory 213. The bridge/memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard (not shown) to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The computer system 200 includes a system power supply 250. The system power supply 250 receives power from a power source such as a wall socket (not shown) or other power source. The system power supply 250 includes an inverter unit 251 that processes the power received from the power source and transmits the power in a high frequency alternating current (AC) domain on an AC bus 255. The computer system 200 includes a high frequency AC voltage regulator module 260. The high frequency AC voltage regulator module 260 is coupled to the AC bus 255. The high frequency AC voltage regulator module 260 receives power in the AC domain from the AC bus 255 and includes a post-regulator unit 261 that regulates the power to a voltage and current level appropriate for the processor 201. It should be appreciated that the system power supply 250 may be implemented in electronic systems other than the computer system 200.

FIG. 2 illustrates the computer system having a single high frequency AC voltage regulator module 260 coupled to the AC bus 255. It should be appreciated that any number of high frequency AC voltage regulator modules may be coupled to the AC bus 255 to provide regulated power to the components in the computer system. According to an embodiment of the present invention, the memory 213, memory/bridge controller 211, network controller 221, display device controller 222, data storage device 231, keyboard interface 232, audio controller 233, and bus bridge 224 may each be coupled to a high frequency AC voltage regulator module (not shown) that receives power from the AC bus 255.

Figure 3:
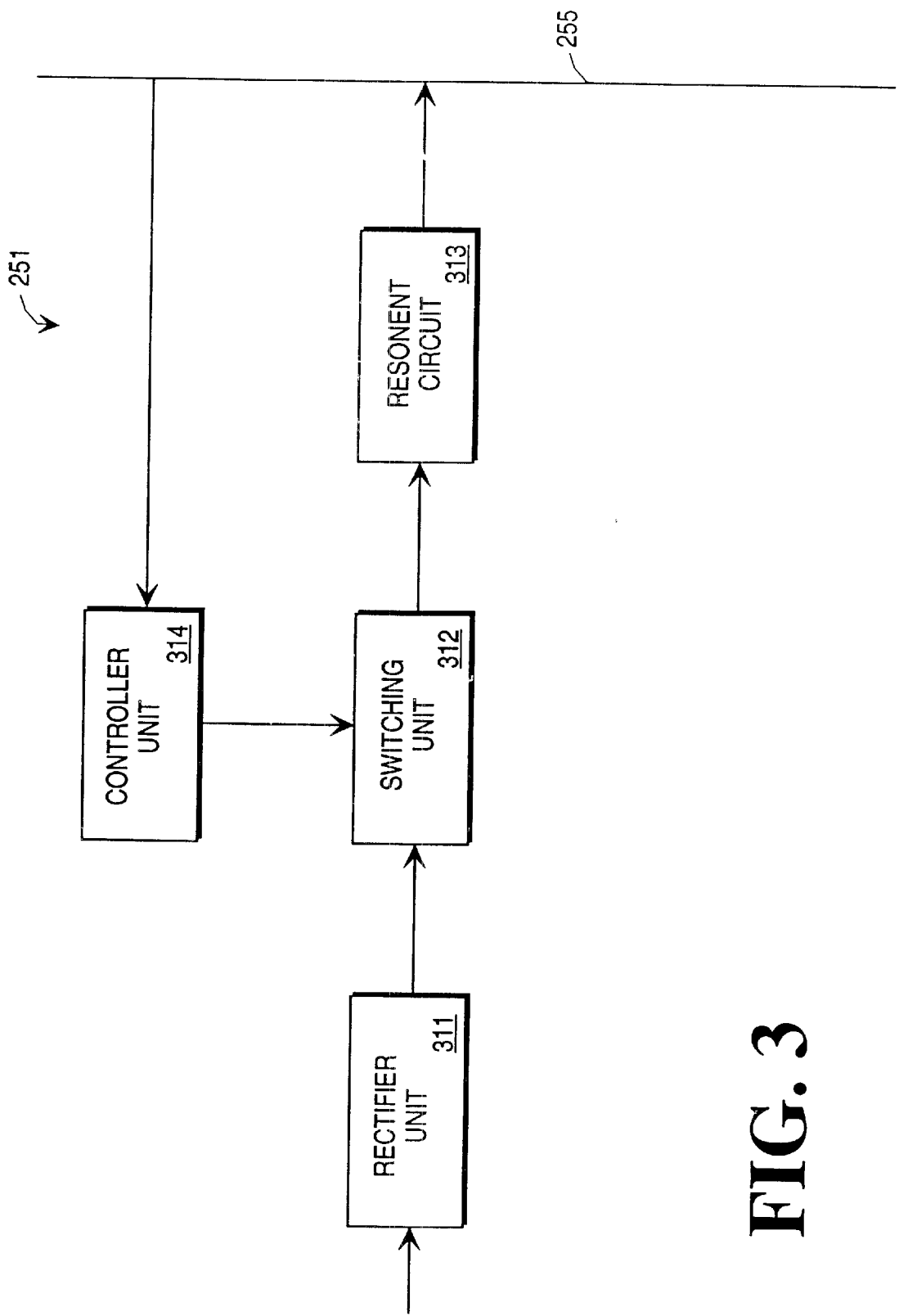
FIG. 3 is a block diagram of an inverter system power supply according to an embodiment of the present invention.

FIG. 3 is a block diagram of an inverter 251 in a system power supply according 250 (shown in FIG. 2) to an embodiment of the present invention. The inverter unit 251 includes a rectifier unit 311. The rectifier unit 311 receives AC power from a power source (not shown). The rectifier unit 311 converts the AC power to a DC domain. A switching unit 312 is coupled to the rectifier unit 311. The switching unit 312 receives the DC power from the rectifier unit 311 and converts the DC power to a high frequency AC domain. A resonant circuit 313 is coupled to the switching unit 312. The resonant circuit 313 receives high frequency AC power from the switching unit 312 and smooths the high frequency AC power before transmitting it onto the AC bus 255. The resonant circuit 313 filters out high harmonics in the high frequency AC power. According to an embodiment of the present invention, the resonant circuit 313 includes a capacitive component and an inductive component. A controller unit 314 is coupled to the AC bus 255 and the switching unit 312. The controller unit 314 monitors the voltage and current levels at the output of the inverter 251 and adjusts the switching unit 312 such that the power transmitted onto the AC bus 255 via the resonant circuit 313 is at predetermined level.

The rectifier unit 311, switching unit 312, resonant circuit 313, and the controller unit 314 may be implemented using any known circuitry or technique. According to an embodiment of the present invention, the rectifier unit 311, switching unit 312, resonant circuit 313, and the controller unit 314 all reside on a single semiconductor.

Figure 4:
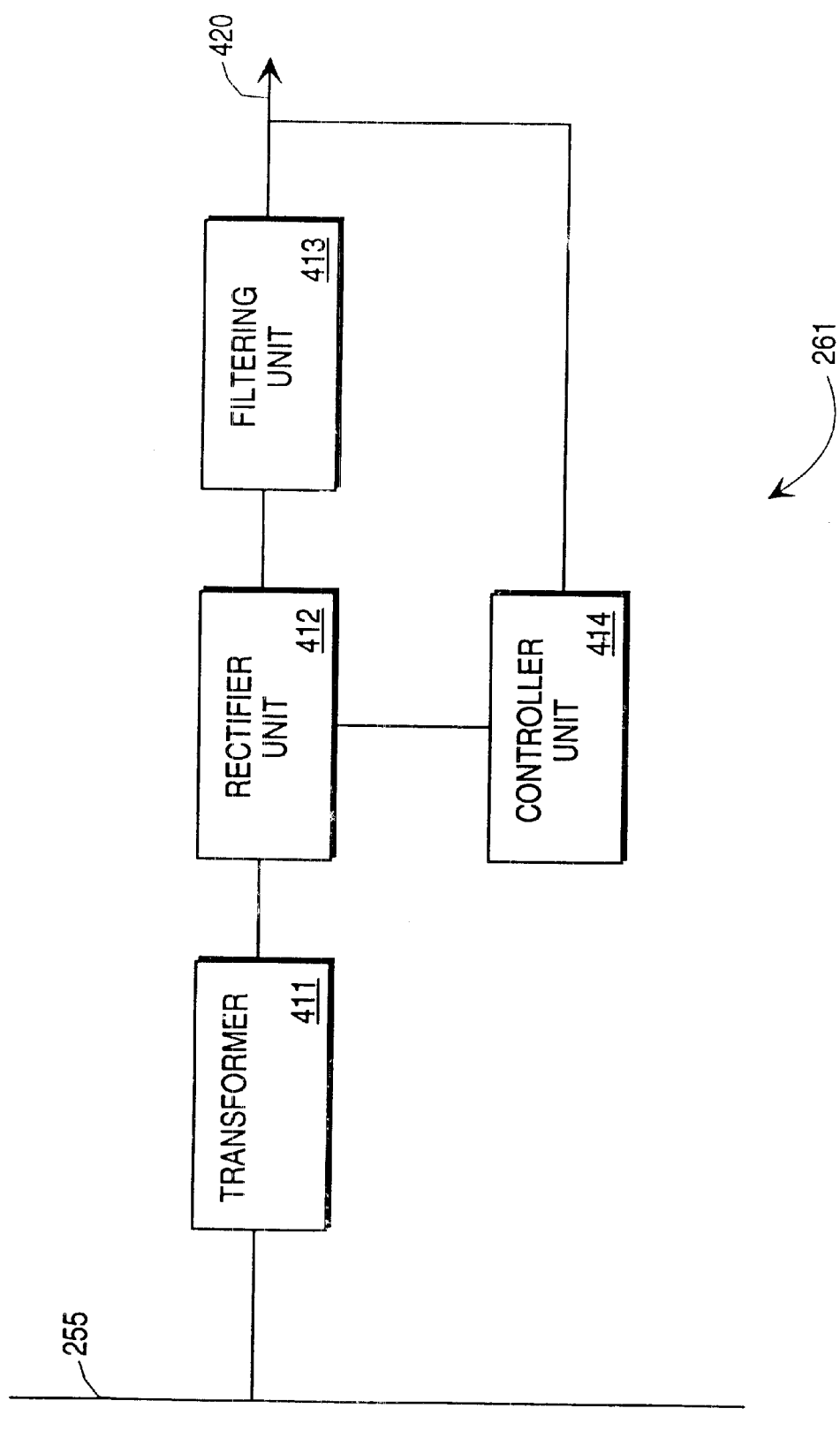
FIG. 4 is a block diagram of a post-regulator in a high frequency alternating current voltage regulator modulate according to an embodiment of the present invention.

FIG. 4 is a block diagram of a post-regulator unit 261 in a high frequency AC voltage regulator module 260 (shown in FIG. 2) according to an embodiment of the present invention. The post-regulator unit 261 is coupled to the AC bus 255. The post-regulator unit 261 includes a transformer unit 411. The transformer unit 411 receives the high frequency AC power from the AC bus 255 and steps the high frequency AC power down to a lower level. A rectifier unit 412 is coupled to the transformer 411. The rectifier unit 412 receives the high frequency AC power from the transformer unit and converts the high frequency AC power into the DC domain. A filtering unit 413 is coupled to the rectifier unit 412. The filtering unit 413 receives the DC power from the rectifier unit 412 and filters away ripple from the DC power before transmitting the power to a component on the computer system (not shown) via line 420. A controller unit 414 is coupled to the line 420 and the rectifier unit 412. The controller unit 414 monitors the voltage and current levels on the line 420 and adjusts the rectifier unit 412 such that the power transmitted onto the line 420 via the filter 413 is at predetermined level. According to an embodiment of the present invention, the post regulator 261 may include only the rectifier unit 412 that converts the high frequency AC power from the AC bus into the DC domain before transmitting it to the line 420.

The transformer unit 411, rectifier unit 412, filtering unit 413, and the controller unit 414 may be implemented using any known circuitry or technique. According to an embodiment of the present invention, the rectifier unit 412, filtering unit 413, and the controller unit 414 may all reside on a single semiconductor substrate, be discrete components, or be a combination of both.

The system power supply 250 (shown in FIG. 2) and the high frequency AC voltage regulator module 260 (shown in FIG. 2) allows the distribution of power in a high frequency AC domain. Distribution of power in the high frequency AC domain improves the reliability of voltage regulation to components in the computer system having high DI/DT requirements. The system power supply 250 and the high frequency AC voltage regulator module 260 also eliminates the need for dual conversion as required by DC power distribution systems. Furthermore, the utilization of the AC bus 255 to distribute high frequency AC power eliminates the requirement of multiple winding transistors and additional rectifiers and filters.

Figure 5A:
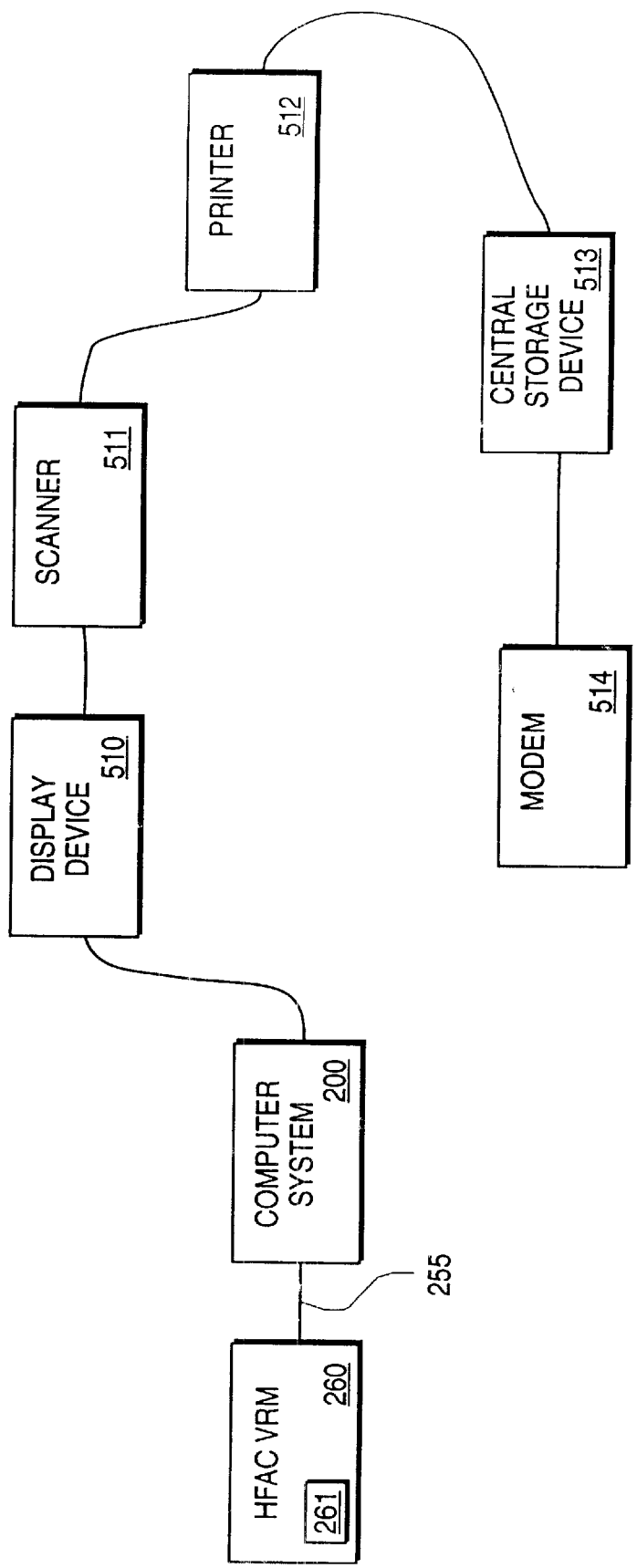
FIG. 5a is a block diagram illustrating devices external to the chassis of a computer system connected together in a daisy-chain topology and powered by the high frequency alternating current power distribution system according to an embodiment of the present invention.
Figure 5B:
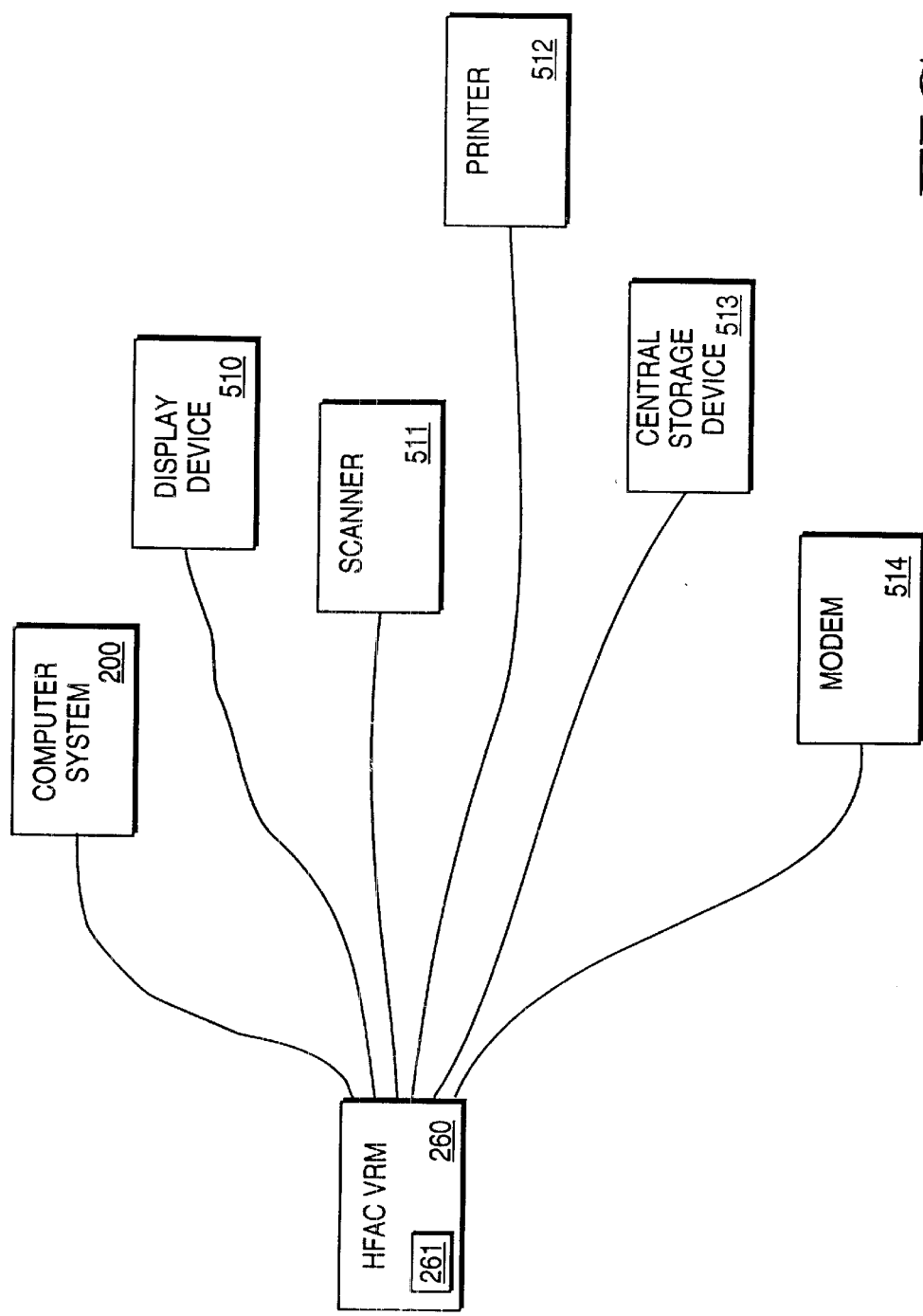
FIG. 5b is a block diagram illustrating devices external to the chassis of a computer system connected together in a hub topology and powered by the high frequency alternating current power distribution system according to an embodiment of the present invention.

It should be appreciated that the high frequency AC power distribution system of the present invention may also be used to supply power to devices connected externally to chassis of the computer system 200 (shown in FIG. 2) such as printers, scanners, external storage devices, modems, integrated services digital network (ISDN) devices, cameras, and other devices. According to an embodiment of the present invention, the system power supply 250 may reside external to the chassis of the computer system 200. The system power supply 250 may supply power to the computer system 200 and the devices connected externally to the chassis of the computer system 200 via a single cable configured in a daisy chain as illustrated in FIG. 5a. In this embodiment, an AC bus (not shown) may reside inside the system power supply 250 and a single signal bus 555, such as a Universal Serial Bus, may be coupled to the AC bus and used to deliver power to the computer system 200, display device 510, scanner 511, printer 512, external storage device 513, and modem 514. Alternatively, the system power supply 250 may supply power to the computer system 200 and the devices connected externally to the chassis of the computer system 200 via a hub configuration as illustrated in FIG. 5b. In this embodiment, a plurality of signal buses 556–561, such as Universal Serial Buses, may be coupled to the AC bus and used to deliver power to the computer system 200, display device 510, scanner 511, printer 512, external storage device 513, and modem 514. Each of the devices connected externally to the chassis of the computer system 200 includes a high frequency AC voltage regulator module such as the one described in FIG. 4.

By utilizing the high frequency AC power distribution system of the present invention to distribute power to devices connected externally to the chassis of the computer system 200, the devices are no longer required to have their own independent power supply. Thus, cost and physical space requirements for these devices are reduced.

Figure 6:
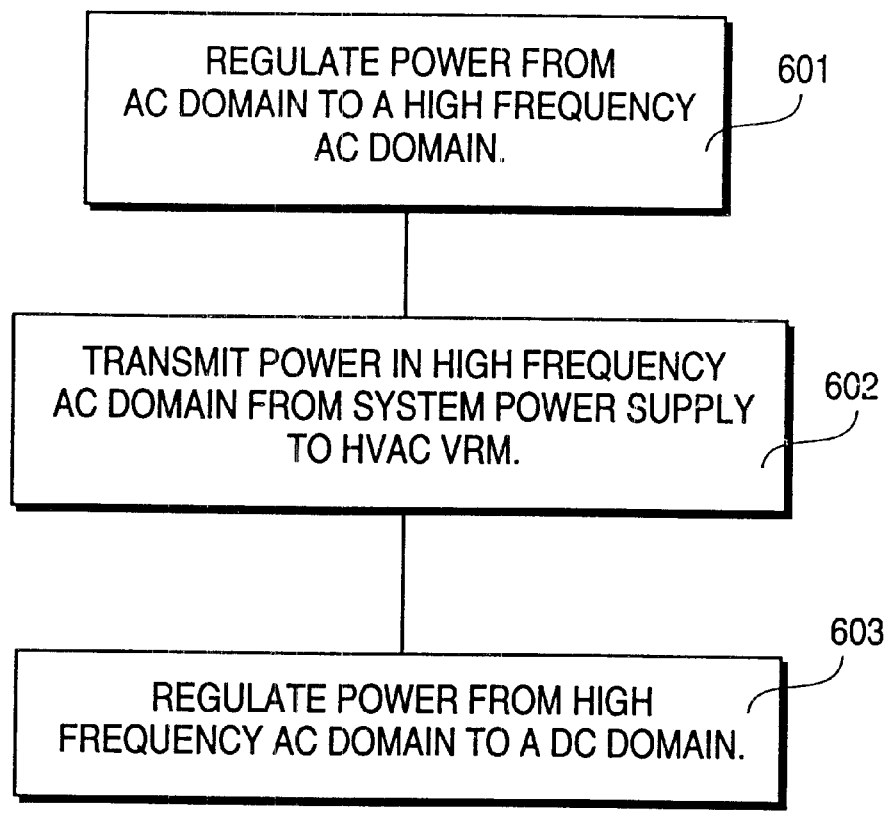
FIG. 6 is a flow chart illustrating a method for distributing power according to an embodiment of the present invention.

FIG. 6 is a flow chart illustrating a method for distributing power according to an embodiment of the present invention. At step 601, power in an AC domain is regulated from a low frequency AC domain to a high frequency AC domain. According to an embodiment of the present invention, the power in the AC domain is regulated to the high frequency AC domain by rectifying the power from the AC domain to a DC domain and converting the power from the DC domain to the high frequency AC domain.

At step 602, the high frequency AC power is transmitted from a system power supply to a high frequency AC voltage regulator module.

At step 603, the power is regulated from the high frequency AC domain to a DC domain. According to an embodiment of the present invention, the power is regulated from the high frequency AC domain to the DC domain by stepping down the power and rectifying the power from the high frequency AC domain to the DC domain.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method for distributing power in an electronic system, comprising:
    regulating power from a low frequency alternating current (AC) domain of a system power supply to a high frequency AC domain; and
    transmitting power in the high frequency domain from the system power supply of the electronic system to a high frequency AC voltage regulator module via an AC bus.

2. The method of claim 1, wherein regulating the power from the AC domain to the high frequency AC domain comprises:
    rectifying the power from the AC domain to a direct current (DC) domain; and
    converting the power from the DC domain to the high frequency AC domain.

3. The method of claim 2, further comprising smoothing an output of the power in the high frequency AC domain.

4. The method of claim 1 further comprising regulating the power in the high frequency AC domain to a direct current (DC) domain.

5. The method of claim 4, wherein regulating the power in the high frequency AC domain to the DC domain comprises:
    stepping down the power; and
    rectifying the power from the high frequency AC domain to the DC domain.

6. The method of claim 5 further comprising filtering an output of the power in the DC domain.

7. A system power supply of an electronic system, comprising: an inverter that regulates power from a low frequency alternating current (AC) domain of the system power supply to a high frequency AC domain to transmit said power in the high frequency AC domain on an AC bus to a high frequency AC voltage regulator module (VRM).

8. The system power supply of claim 7, wherein the inverter comprises a rectifier unit that converts the power from an AC domain to a direct current (DC) domain.

9. The system power supply of claim 8, wherein the inverter further comprises a switching unit that converts the power from a DC domain to a high frequency AC domain.

10. The system power supply of claim 9, wherein the inverter further comprises a resonant circuit that filters out high harmonics in an output of the power in the high frequency AC domain.

11. A high frequency alternating current (AC) voltage regulator module (VRM), comprising:
   a post-regulator unit that regulates power in a high frequency AC domain from an AC bus to a component on an electronic system.

12. The high frequency AC VRM of claim 11, wherein the post-regulator unit comprises a rectifier unit that converts the power from the high frequency AC domain to a direct current (DC) domain.

13. The high frequency AC VRM of claim 12, wherein the post-regulator unit further comprises a filtering unit that filters out ripple from an output of the power from the DC domain.

14. An electronic system, comprising:
   a bus;
   a system power supply, coupled to the bus, that regulates power from a low frequency alternating current (AC) domain of a system power supply to a high frequency AC domain to transmit said power in the high frequency AC domain on the bus;
   a high frequency AC voltage regulator module (VRM), coupled to the bus, that regulates the power from the high frequency AC domain to a direct current (DC) domain;
   a processor, coupled to the high frequency AC VRM, that receives the power from the AC VRM.

15. An apparatus, comprising:
   an inverter that regulates power from a low frequency alternating current (AC) domain of a system power supply to a high frequency AC domain to transmit said power in the high frequency AC domain on an AC bus to a high frequency AC voltage regulator module (VRM).

16. The apparatus of claim 15, wherein the inverter comprises a rectifier unit that converts the power from an AC domain to a direct current (DC) domain.

17. The apparatus of claim 16, wherein the inverter further comprises a switching unit that converts the power from a DC domain to a high frequency AC domain.

18. A method comprising:
   regulating power from a low frequency alternating current (AC) domain of a system power supply to a high frequency AC domain in a computer system; and
   transmitting power in the high frequency domain from the system power supply of the computer system to a high frequency AC voltage regulator module.

19. The method of claim 18, wherein regulating the power from the AC domain to the high frequency AC domain comprises:
   rectifying the power from the AC domain to a direct current (DC) domain; and
   converting the power from the DC domain to the high frequency AC domain.

20. The method of claim 19, further comprising smoothing an output of the power in the high frequency AC domain.

21. The method of claim 18 further comprising regulating the power in the high frequency AC domain to a direct current (DC) domain.

22. The method of claim 21, wherein regulating the power in the high frequency AC domain to the DC domain comprises:
   stepping down the power; and
   rectifying the power from the high frequency AC domain to the DC domain.

23. The method of claim 22 further comprising filtering an output of the power in the DC domain.

24. A system power supply of a computer system, comprising:
   an inverter that regulates power from a low frequency alternating current (AC) domain of the system power supply to a high frequency AC domain to transmit said power in the high frequency domain on an AC bus to a high frequency AC voltage regulator module (VRM).

25. The computer system power supply of claim 24, wherein the inverter comprises a rectifier unit that converts the power from an AC domain to a direct current (DC) domain.

26. The computer system power supply of claim 25, wherein the inverter further comprises a switching unit that converts the power from a DC domain to a high frequency AC domain.

27. The computer system power supply of claim 26, wherein the inverter further comprises a resonant circuit that filters out high harmonics in an output of the power in the high frequency AC domain.

* * * * *